United States Patent Office 3,248,247
Patented Apr. 26, 1966

3,248,247
PROCESS FOR THE STABILIZATION OF LIGHT SENSITIVE RESINOUS ORGANIC MATERIAL AND COMPOSITIONS PREPARED THEREFROM
Hansjörg Heller, Riehen, near Basel, and Jean Rody, Basel, Switzerland, assignors to J. R. Geigy A.-G., Basel, Switzerland
No Drawing. Filed June 15, 1962, Ser. No. 202,672
Claims priority, application Switzerland, June 16, 1961, 7,104/61
16 Claims. (Cl. 106—179)

The present invention concerns a process for the stabilization of light sensitive polymeric organic materials as well as, as industrial product, the light sensitive material stabilized by this process.

It has been found that light sensitive polymeric organic material can be protected from the injurious effect of light, particularly of UV light, by incorporating thereinto at least one compound of the general formula

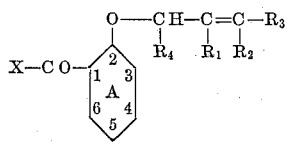

(I)

in which
X represents an aromatic radical of the benzene series which, by means of an oxygen bridge, can also form a xanthone with the nucleus A, or an alkoxy, alkenyloxy, cycloalkoxy, aralkoxy or aryloxy radical, and
each of $R_1$, $R_2$, $R_3$ and $R_4$ represents hydrogen or an alkyl or aryl radical,
and in the nucleus A at least the 3- or 5-position is unoccupied and the benzene rings can contain further inert substituents.

The benzene rings can contain, for example, alkyl groups such as the methyl, ethyl, propyl, isopropyl, n-, iso-, or tert. butyl or n-octyl group; cycloalkyl groups such as the cyclohexyl group; aralkyl groups such as the benzyl group; or aryl groups, e.g. the phenyl or 2-, 3- or 4-chlorophenyl or 2-, 3- or 4-methylphenyl group; hydroxyl groups; ether groups, for example alkoxy groups such as the methoxy or ethoxy group; or alkenyloxy groups such as the allyloxy or methallyloxy group, cycloalkoxy groups such as the cyclohexyloxy group; aralkoxy groups such as the benzyloxy groups or aryloxy groups e.g. the phenoxy group; acyloxy groups such as the acetoxy or benzoyloxy group; or halogens e.g. chlorine or bromine.

If X is an aromatic radical of the benzene series bound direct to the carbon atom of the carbonyl group, then it can be bound to the 6-position of the benzene ring A by way of an oxygen bridge and thus form a xanthone.

If X is an alkoxy radical then it is, e.g. the methoxy, ethoxy, a propoxy, a butoxy or an octyloxy radical; if it is an alkenyloxy radical then it represents, e.g. the allyloxy radical; if it is a cycloalkoxy radical then it is, for example the cyclohexyloxy radical; if it is an aralkoxy radical then it is, e.g. the benzyloxy radical, and if it is an aryloxy radical, then it is principally a radical of the benzene series, for example, a phenoxy radical.

Insofar as one of $R_1$, $R_2$, $R_3$ and $R_4$ is an alkyl radical then it is mainly a low alkyl radical such as the methyl, ethyl, a propyl or a butyl radical; if one is an aryl radical then it is, e.g. the phenyl radical or the 2-, 3- or 4-chlorophenyl radical or the 2-, 3- or 4-methylphenyl radical. $R_4$ is preferably hydrogen and $R_1$ and $R_2$ are preferably hydrogen or methyl.

Those compounds of Formula I are preferred in which X is an aromatic radical of the benzene series bound direct to the carbon atom of the carbonyl group, in particular the phenyl radical, and also those compounds which, in the 4-position of the benzene nucleus A, contain an ether group, in particular an alkoxy group.

Compounds of Formula I usable according to the invention are obtained, for example, by alkenylating in an alkaline medium the corresponding hydroxyl compound with an alkenyl halide of Formula II.

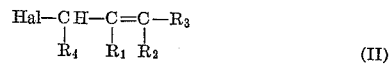

(II)

in which $R_1$, $R_2$, $R_3$ and $R_4$ have the meanings given under Formula I.

Compounds of Formula I in which X is a radical of the benzene series bound direct to the carbon atom of the carbonyl group can, in some cases, be obtained by introduction, according to Friedel-Crafts, of the X—CO— radical into the corresponding alkenyloxybenzene which contains a replaceable hydrogen atom in o-position to the alkenyloxy group. For example, an acid X—COOH is condensed with an alkenylphenyl ether reacting in the 2-position at, at most, 20° C.

Compounds of Formula I in which X represents an alkoxy, alkenyloxy, cycloalkoxy, aralkoxy or aryloxy radical can be produced by esterification, by the usual methods, of the corresponding 2-alkenyloxybenzoic acids with the desired organic hydroxyl compounds.

Compounds of Formula I can easily be incorporated into organic materials because they dissolve well therein; in addition they are fast to sublimation. They are incorporated into the light sensitive carriers in slight amounts of 0.001–5%, in particular, in amounts of 0.01–1%, of the carrier.

Carriers for the new compounds of Formula I are mainly polymers, principally completely synthetic polymers, e.g. addition polymers such as polymers of ethylenically unsaturated monomers, e.g. polyvinyl chloride, polyvinylidene chloride, styrene polymers, diene polymers, and also their copolymers, polyethylene, polypropylene, polyacrylic compounds, polymethylmethacrylate or polyacrylonitrile, also condensation polymers such as polyesters, e.g. polyethylene glycol terephthalates, or polyamides, e.g. polycaprolactam, or also mixed polymers, e.g. polyester resins such as unsaturated polyesters copolymerized with ethylenically unsaturated monomers, e.g. styrene, methylmethacrylate etc.; also natural polymers or synthetic modifications thereof such as e.g. cellulose esters. In other words, the carrier can be an organic resin such as a hydrocarbon polymer, a polyester, a polyamide, polymers of ethylenically unsaturated monomers (vinyl and vinylidene polymers) or cellulose esters as well as mixtures of any of the foregoing. The carriers employed however, should be heat stable up to at least 160° C. The new compounds of Formula I may be incorporated into these polymers—depending on the type of polymer—by working in at least one of these compounds and, possibly, other additives such as, e.g. plasticizers, antioxidants, heat stabilizers and pigments, into the melt, advantageously at 140–350° C., by the methods usual in the industry, preferably before or during moulding or by dissolving the polymers and the additives in solvents and subsequently evaporating off the latter. A less preferred method comprises dissolving the compounds in the corresponding monomers before polymerization provided that compounds of Formula I do not participate in the polymerization.

The light sensitive materials can also be protected from the injurious effect of light by painting them with a protecting coating, e.g. a stoving lacquer containing at least one compound of Formula I as defined. In this case, the amount of stabilizer added is advantageously 10–30%

(calculated on the protective coating material) for protective coatings of less than 0.01 mm. thickness and 1–10% for protective coatings of 0.01–0.1 mm. thickness.

Particularly valuable compounds subgeneric to Formula I correspond to the formula

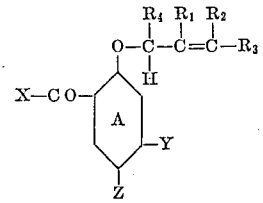

wherein

X is alkyloxy ($C_{1-12}$), i.e. alkyloxy containing 1 to 12 carbon atoms, e.g. methoxy, butoxy, octyloxy etc., alkenyloxy ($C_{1-8}$) especially allyloxy; cycloalkyloxy ($C_{5-8}$) especially cyclohexyloxy; monocyclic aralkloxy ($C_{7-10}$) especially benzyloxy; monocyclic aryloxy ($C_{6-12}$); monocyclic aryl ($C_{6-11}$) or ortho(monocyclic)-arylene(mono)oxy, which oxy moiety is linked in the ortho position to the —CO— moiety in the ring A thus forming a xanthone nucleus, $R_1$ and $R_2$ are independently hydrogen or methyl, $R_3$ is hydrogen, alkyl ($C_{1-5}$), e.g., methyl, amyl etc., or monocyclic aryl, especially phenyl, $R_4$ is hydrogen or alkyl ($C_{1-5}$), e.g., amyl, etc., Y is hydrogen, alkyloxy ($C_{1-8}$) e.g. methoxy, butoxy, octyloxy etc., alkenyloxy ($C_{1-8}$) especially allyloxy or monocyclic aryloxy ($C_{6-12}$) especially phenoxy, and Z is hydrogen, halogen especially chlorine, alkyl ($C_{1-8}$), e.g. tert. butyl, octyl etc. cycloalkyl ($C_{5-8}$) especially cyclohexyl or monocyclic aralkyl ($C_{7-10}$), especially benzyl or phenethyl.

In the above formula if X is a monocyclic aryloxy or a monocyclic aryl, the aryl moiety of each is preferably an unsubstituted or a monosubstituted phenyl, preferred substituents being halogen especially chlorine, lower alkyl ($C_{1-5}$), alkenyloxy ($C_{3-4}$) especially allyloxy, and phenyl. On the other hand in the above formula, if X is an ortho(monocyclic)arylene(mono)oxy, then it is preferably an unsubstituted or alkoxy ($C_{1-4}$) substituted orthophenylene(mono)oxy radical. It is not intended however, to be limited in the above language e.g. if X is a monocyclic aryl it can also be disubstituted preferably by alkoxy ($C_{1-4}$) e.g. methoxy para to the —CO— moiety, the other substituent being alkenyloxy ($C_{3-4}$) e.g. alkyloxy ortho to said —CO— moiety.

The following examples illustrate the invention. Where not otherwise stated, parts are given as parts by weight. The temperatures are in degrees centigrade. The relationship of parts by weight to parts by volume is as that of kilograms to liters.

*Example 1*

1000 parts of polypropylene granulate (Type 1014 of Avisun Corporation, Marcus Hook, Pa., U.S.A.) and 6 parts of 2-allyloxy-4-butoxy-benzophenone (compound No. 1/1) are mixed in the dry state and, from a screw type extruder at 240°, a film is made therefrom of 0.1 mm. thickness. The film absorbs ultraviolet light of the wave lengths of 300–365 mμ and is more stable to brittleness under the influence of sunlight than a film made from the same polymer but without the addition of a stabilizer by a factor of 6–8.

A similar film is obtained if, instead of the compound used above, one of the compounds given below is used:

(1/2) Bis-2,2′-allyloxy-4-methoxy-benzophenone,
(1/3) 2-allyloxybenzoic acid-p-tert. butylphenyl ester,
(1/4) 2-methallyloxy-4-methoxybenzoic acid-p-tert. octyl ester, or (1/5) 2-methallyloxy-4-methoxybenzoic acid cyclohexyl ester,
(1/6) 2-allyloxy-4-methoxy-benzoic acid-methyl ester,
(1/7) 2-allyloxy-4-methoxy-benzoic acid-butyl ester,
(1/8) 2-allyloxy-4-methoxy-benzoic acid-allyl ester,
(1/9) 2-allyloxy-4-methoxy-benzoic acid-benzyl ester,
(1/10) 2-allyloxy-5-cyclohexyl-benzoic acid-phenyl ester,
(1/11) 2-methallyloxy-5-tert.-butyl-benzoic acid-phenyl ester, or
(1/12) 2-methallyloxy-5-octyl-benzoic acid-phenyl ester.

The benzophenone compounds used in this and in the following examples are produced as follows:

Equivalent amounts of a corresponding o-hydroxybenzophenone and alkenyl halides are reacted by refluxing in the presence of anhydrous potassium carbonate until, after the addition of caustic soda lye, a sample no longer changes color. The inorganic salt is filtered off and the acetone in the filtrate is distilled off in vacuo. The product so obtained is freed from adhesive inorganic salts by washing with water and, if necessary—i.e. if it is a strong yellow color—it is purified by distillation under high vacuum the temperature of which should not exceed 170°. Compounds Nos. 1/1, 1/2, 2/1, 2/2, 4/1, 4/2, 5/1 to 5/8 are produced in this manner.

Equivalent amounts of a benzophenone compound and methallyl chloride are refluxed in the presence of potassium carbonate and a catalytic amount of potassium iodide and the procedure is as described above. In this way the compound 3/1 is obtained. On using $\Delta^2$-butenyl chloride instead of methallyl chloride and otherwise the same procedure, the compound No. 4/3 is obtained.

If, instead of the benzophenone compounds mentioned above, possibly substituted salicylic acid esters are used and they are reacted by one of the methods given with alkenyl halides then the compounds Nos. 1/3 to 1/12, 4/4, 4/5, 4/6 and 4/8 are obtained.

The compounds 4/7 and 6/1 to 6/7 are produced by reaction of an equivalent amount of a possibly substituted hydroxyxanthone compound with alkenyl halides under the conditions described in the last paragraph but one above.

*Example 2*

100 parts of marketed polyethylene terephthalate (Terlenka of Allgemeene Kunstzijde Unie, Arnhem, Holland), and 2 parts of 2-allyloxy-4-methoxybenzophenone (compound No. 2/1) are mixed in a dry state and the mixture is extruded at a temperature of 285° into a continuous film of about 0.2 mm. thickness. The transparent, substantially colorless film absorbs UV light of the wave lengths under 370 mμ and is suitable as heat-sealable packing material for goods which are UV sensitive.

Similar films are obtained if, instead of the compound used above, 2,4-diallyloxybenzophenone (compound No. 2/2) is used.

In the same way, also polyesters produced from 4,4′-dicarboxydiphenylsulphone and 1,4-butylene glycol, can be employed as UV dense, light stabilizing material.

*Example 3*

100 parts of marketed polyamide chips (polycaprolactam of Emser Werke A.G., Domat (Ems), Switzerland), and 1 part of 2-methallyloxy-4-methoxybenzophenone (compound No. 3/1) are mixed and the mixture is blown from an extruder fitted with a ring dye at a temperature of 245–255° into a continuous film of about 0.08 mm. thickness. The transparent film absorbs UV light and at a wave length of 365 mμ has a transmittance of less than 10%.

Similar films are obtained if, instead of polycaprolactam, polyhexamethyleneadipamide (nylon 66) is used.

*Example 4*

100 parts of polyvinyl chloride (Hostalit C 270 of Farbwerke Hoechst A.G., Frankfurt am Germany), 1 part of Thermolite 31, 0.5 part of Thermolite 17 (Metal and Thermit Corporation, Rahway, U.S.A.), 1 part of Wax E (Hoechst) and 1 part of 2-allyloxy-4′-chloro-4-methoxybenzophenone (compound No. 4/1) are mixed on a set of mixing rollers for 10 minutes at 180° and the mixture is then drawn off in the form of a sheet of 0.5 mm. thickness. The stiff, substantially colorless and transparent sheet absorbs substantially all UV light of the wave lengths under 380 mμ. The sheet can subsequently be molded into articles which serve, e.g. for the storing of UV sensitive goods.

Similar sheets are obtained if, instead of the benzophenone compound used above, one of the following compounds is used.

(4/2) 2-allyloxy-4′-methyl-4-methoxybenzophenone,
(4/3) 2 - Δ²′ - butenyloxy - 4′phenyl - 4 - methoxybenzophenone,
(4/4) 2 - allyloxy - 4 - phenoxy - benzoic acid - p-tert·butylphenyl ester,
(4/5) 2 - allyloxy - 4 - methoxy - benzoic acid - p-chlorophenyl ester,
(4/6) 2-allyloxy-4-methoxy-benzoic acid phenyl ester,
(4/7) 1-allyloxy-4-chloroxanthone (the numbering of the xanthone is taken from "the Ring Index," Patterson, Capell, 2nd edition, No. 3571, American Chemical Society), or
(4/8) 2-allyloxy-4-benzoyloxy-benzoic acid phenyl ester.

*Example 5*

100 parts of methacrylate resin (Resarit 844–Z of Resart Gesellschaft, Kalkhof & Rose, Chem. Fabrik, Mainz (Rhine), Germany), and 0.2 part of 2-allyloxy-4-methoxybenzoic acid phenyl ester (compound No. 4/6) are mixed together in a dry state and injection molded at a temperature of 195–205° into watch glasses of 2 mm. thickness. The watch glasses absorb substantially all UV light and are particularly suitable for the covering of colored watch faces.

Similar glasses are obtained if, instead of 2-allyloxy-4-methoxy benzoic acid phenyl ester, (5/1) 2-allyloxy-4-octyloxy-5-chlorobenzophenone,
(5/2) 2-allyloxy-4-butoxy-5-tert.-butyl-4′-chlorobenzophenone,
(5/3) 2-methallyloxy-4-methoxy-5-cyclohexyl-2′-chlorobenzophenone,
(5/4) 2-Δ²′′-octenyloxy-4-methoxy-benzophenone,
(5/5) 2-α-amyl-allyloxy-4-methoxy-benzophenone,
(5/6) 2-allyloxy-4-methoxy-5-α-phenylethyl-benzophenone,
(5/7) 2-cinnamyloxy-4-methoxy-benzophenone,
(5/8) 2-cinnamyloxy-4-butoxy-benzophenone.

*Example 6*

100 parts of polystyrene (of Shell Petrochemicals Ltd., England), are mixed with 0.2 part of 2-allyloxy-4-methoxy-benzophenone and extruded at 240° into plates of 2 mm. thickness. These plates absorb UV light and are less prone to yellowing on exposure to light than a similar plate produced without any additive.

*Example 7*

100 parts of marketed polyethylene glycol terephthalate granulate ("Dacron" of Du Pont Co., Wilmington, Delaware, U.S.A.), are sprayed with a benzene solution containing 0.2 part (calculated on the polyester) of 1-allyloxy-4-chloroxanthone. The solvent is evaporated off in vacuo and sharply dried chips are blown from an extruder through a ring dye into films. Samples thereof show no noticeable alteration after 500 hours' exposure in the fadeometer. They are substantially UV dense and are suitable for packing light sensitive foodstuffs.

Similar films are obtained if, instead of the compound used above, (7/1) 1-allyloxy-3-methoxyxanthone,
(7/2) 1-allyloxy-3-butoxyxanthone,
(7/3) 1,3-bis-allyloxyxanthone,
(7/4) 1-allyloxy-3,6-dimethoxyxanthone,
(7/5) 1-methallyloxy-3-methoxyxanthone,
(7/6) 1-methallyloxy-3-butoxyxanthone, or
(7/7) 1-cinnamyloxy-3-methoxyxanthone, is used.

*Example 8*

1000 parts of cellulose acetobutyrate granulate ("Cellidor B" of Bayer Farbenfabriken, Leverkusen, Germany), and 5 parts of 4,4′-dimethoxy-2,2′-dimethylallyloxybenzophenone are mixed and extruded from a screw type extruder into a continuous ribbon at a bulk temperature in the dye of 190–195° C. The ribbon obtained absorbs UV light and shows less tendency to embrittle on exposure to light than a similar ribbon produced from Cellidor B but without any benzophenone additive.

What is claimed is:

1. Process for the stabilization of a light sensitive resinous carrier which is heat stable up to at least 160° C. which comprises incorporating into said resinous carrier a stabilizing amount of a compound of the formula

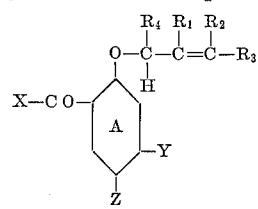

wherein
X is a member selected from the group consisting of alkyloxy, alkenyloxy, cycloalkyloxy, phenylalkyloxy, phenoxy, phenyl and orthophenylene(mono)oxy which oxy moiety is linked in ortho position in the —CO— group to the ring A,
$R_1$ and $R_2$ are independently selected from the group consisting of hydrogen and methyl,
$R_3$ is a member selected from the group consisting of hydrogen, alkyl and phenyl,
$R_4$ is a member selected from the group consisting of hydrogen and alkyl,
Y is a member selected from the group consisting of hydrogen, alkyloxy, alkenyloxy and phenoxy, and
Z is a member selected from the group consisting of hydrogen, halogen, alkyl, cycloalkyl and phenylalkyl.

2. Process for the stabilization of a light sensitive resinous carrier which is heat stable up to at least 160° C. which comprises incorporating into said resinous carrier a stabilizing amount of a compound of the formula

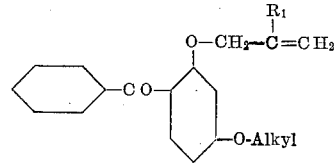

wherein $R_1$ is hydrogen.

3. Process for the stabilization of a light sensitive resinous carrier which is heat stable up to at least 160° C. which comprises incorporating into said resinous carrier a stabilizing amount of a compound of the formula

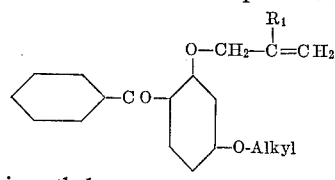

wherein $R_1$ is methyl.

4. Process of the stabilization of a resinous carrier which is heat stable up to at least 160° C. which comprises incorporating into said resinous carrier a stabilizing amount of a compound of the formula

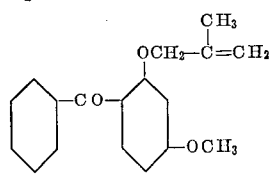

5. Process for the stabilization of a resinous carrier which is heat stable up to at least 160° C. which comprises incorporating into said resinous carrier a stabilizing amount of a compound of the formula

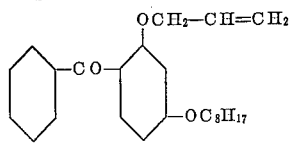

6. Process for the stabilization of a resinous carrier which is heat stable up to at least 160° C. which comprises incorporating into said resinous carrier a stabilizing amount of a compound of the formula

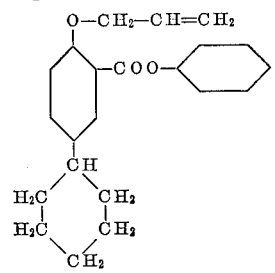

7. Process for the stabilization of a resinous carrier which is heat stable up to at least 160° C. which comprises incorporating into said resinous carrier a stabilizing amount of a compound of the formula

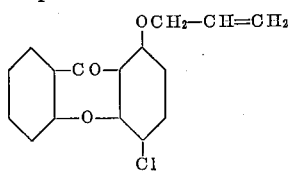

8. Process for the stabilization of a resinous carrier which is heat stable up to at least 160° C. which comprises incorporating into said resinous carrier a stabilizing amount of a compound of the formula

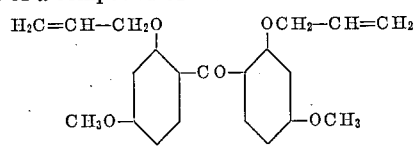

9. A stable composition of matter which comprises a light sensitive resinous material which is heat stable up to at least 160° C. having incorporated therein a stabilizing amount of a compound of the formula

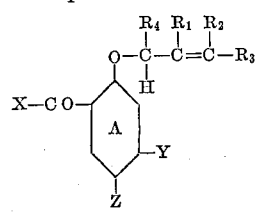

wherein
X is a member selected from the group consisting of alkyloxy, alkenyloxy, cycloalkyloxy, phenylalkyloxy, phenoxy, phenyl and ortho phenylene (mono)oxy which oxy moiety is linked in ortho position to the —CO— group to the ring A, $R_1$ and $R_2$ are independently selected from the group consisting of hydrogen and methyl, $R_3$ is a member selected from the group consisting of hydrogen, alkyl and phenyl, $R_4$ is a member selected from the group consisting of hydrogen and alkyl, Y is a member selected from the group consisting of hydrogen, alkyloxy, alkenyloxy and phenoxy, and Z is a member selected from the group consisting of hydrogen, halogen, alkyl, cycloalkyl and phenylalkyl.

10. A stable composition of matter which comprises a light sensitive resinous material which is heat stable up to at least 160° C. having incorporated therein a stabilizing amount of a compound of the formula

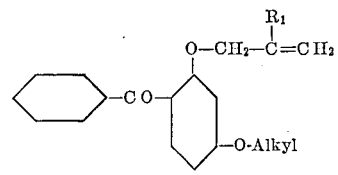

wherein $R_1$ is hydrogen.

11. A stable composition of matter which comprises a light sensitive resinous material which is heat stable up to at least 160° C. having incorporated therein a stabilizing amount of a compound of the formula

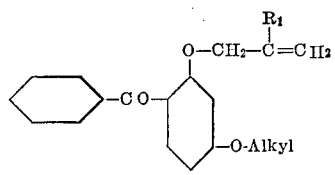

wherein $R_1$ is methyl.

12. A stable composition of matter which comprises a light sensitive resinous material which is heat stable up to at least 160° C. having incorporated therein a stabilizing amount of a compound of the formula

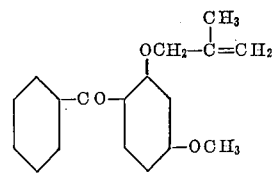

13. A stable composition of matter which comprises a light sensitive resinous material which is heat stable up to at least 160° C. having incorporated therein a stabilizing amount of a compound of the formula

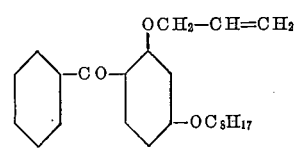

14. A stable composition of matter which comprises a light sensitive resinous material which is heat stable up to at least 160° C. having incorporated therein a stabilizing amount of a compound of the formula

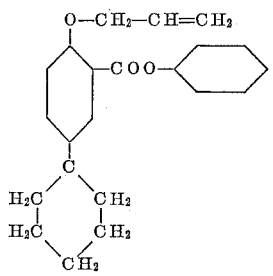

15. A stable composition of matter which comprises a light sensitive resinous material which is heat stable up to at least 160° C. having incorporated therein a stabilizing amount of a compound of the formula

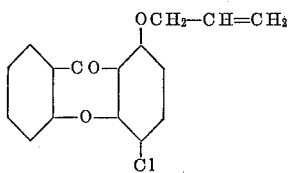

16. A stable composition of matter which comprises a light sensitive resinous material which is heat stable up to at least 160° C. having incorporated therein a stabilizing amount of a compound of the formula

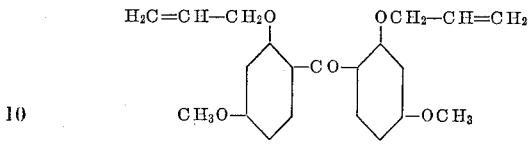

References Cited by the Examiner

UNITED STATES PATENTS

| | | | |
|---|---|---|---|
| 2,906,778 | 9/1959 | Gordon | 260—591 |
| 2,937,157 | 5/1960 | Clark | 260—45.95 |
| 2,962,533 | 11/1960 | Hardy et al. | 260—591 |
| 2,976,259 | 3/1961 | Hardy et al. | 260—45.95 |
| 3,049,503 | 8/1962 | Milionis et al. | 260—591 |

ROBERT F. WHITE, *Primary Examiner.*

MORRIS LIEBMAN, ALEXANDER H. BRODMERKEL, *Examiners.*